O. E. MICHAUD.
JOURNAL BEARING.
APPLICATION FILED FEB. 27, 1913.

1,132,279.

Patented Mar. 16, 1915.

Witnesses:
Edgar S. Farmer
G. A. Pennington

Inventor:
O. E. Michaud,
By Cann & Cann
his attys.

UNITED STATES PATENT OFFICE.

ONESIME E. MICHAUD, OF ST. LOUIS, MISSOURI.

JOURNAL-BEARING.

1,132,279.

Specification of Letters Patent.

Patented Mar. 16, 1915.

Original application filed October 28, 1912, Serial No. 728,064. Divided and this application filed February 27, 1913. Serial No. 751,082.

*To all whom it may concern:*

Be it known that I, ONESIME E. MICHAUD, a citizen of the United States, and a resident of the city of St. Louis and State of Missouri, have invented a new and useful Improvement in Journal-Bearings, of which the following is a specification.

The subject matter of the present invention is divided out of an application for Letters Patent of the United States, for vehicle wheel filed by me on October 28, 1912, Serial Number 728,064.

The present invention relates more particularly to anti-friction journal bearings for vehicle wheels and the like, and it has for its principal objects to relieve the supporting anti-friction elements of end thrust; to provide simple means for taking the end thrust in both directions; and to attain certain advantages which will hereinafter more fully appear.

The invention consists in the parts and in the arrangements and combinations of parts hereinafter described in the claims.

Figure 1:
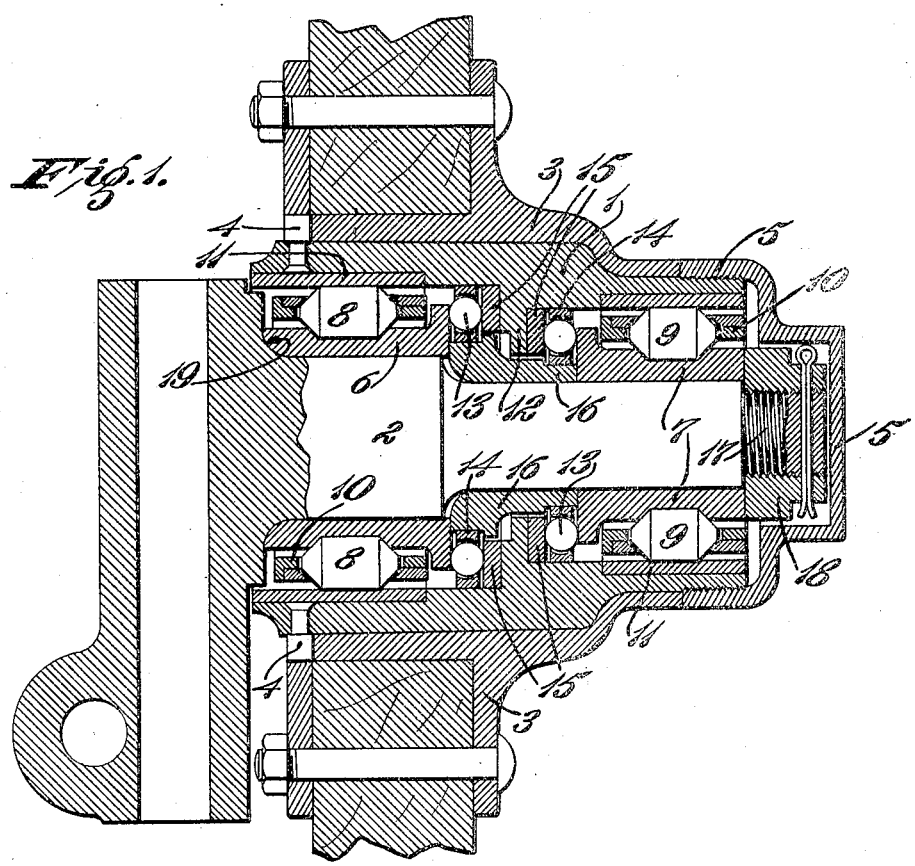
Figure 2:
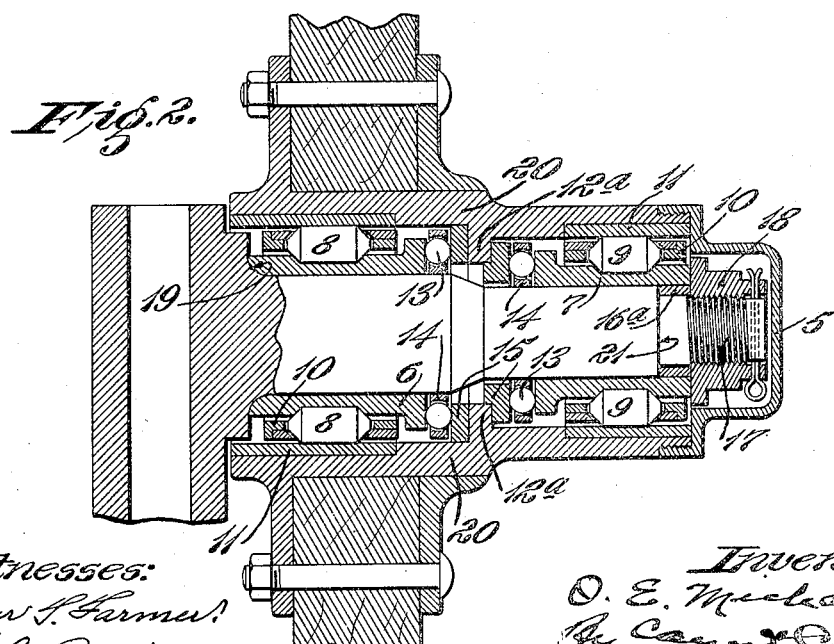

In the accompanying drawing which forms part of this specification, and where in like symbols refer to like parts wherever they occur,—Figure 1 is a longitudinal section through a demountable wheel hub showing an adaptation of the invention thereto; Fig. 2 is a similar view illustrating a modification of the invention.

Referring now more particularly to Fig. 1, the wheel hub comprises a permanent box 1 which is journaled on the axle arm 2. A demountable outer shell or box 3 is slipped over said permanent box 1 and interlocked to rotate therewith, preferably by providing radial studs 4 on said permanent hub box which fit in recesses provided at the inner end of said outer shell. The outer shell 3 is secured on the permanent hub box 1 by a cap 5 which is screwed onto the outer end of said permanent hub box.

The axle arm 2 may be either of one diameter throughout or of two diameters as shown. Bearing sleeves 6, 7, are slipped on said axle arm and located respectively at the inner and outer end thereof. These sleeves are provided with circumferential grooves in which cylindrical bearing rollers 8, 9, are respectively fitted. The rollers are arranged in annular series and spaced apart by suitable cage rings 10. Said cage rings also retain the rollers on the sleeves 6, 7, when the bearings are detached from the wheel hub.

The permanent hub member 1 is preferably provided with hardened bushings or outer bearing rings 11 for the rollers 8, 9. It is also provided about its middle with an internal annular collar or flange 12, and between said collar and the adjacent ends of said bearing sleeves 6, 7, are interposed balls 13 which are arranged in annular series and held separated by spacing rings or cages 14; and hardened bearing rings 15 are preferably placed on opposite sides of said collar 12.

A filler sleeve or collar 16 is slipped on the axle arm between the two bearing sleeves 6, 7, said sleeve being of a length so as to space said bearing sleeves apart just so that there is little or no play in the end thrust bearings provided by the balls 13. The outer end of the axle arm is screw-threaded as at 17 to receive the securing nut 18; and the relative lengths of said sleeves 6, 7, are such that when the nut is applied, said sleeves 6, 7, and said spacing sleeve 16 are clamped between said nut 18 and the shoulder 19 provided at the inner end of the axle arm. Hence, the sleeves 6, 7, and 16, are thus held from rotating with the hub of the wheel.

In the modification shown in Fig. 2, an ordinary non-demountable hub box 20 is shown. This hub box is provided with an internal collar 12ª and the supporting and end thrust bearings are arranged substantially the same as in the structure shown in Fig. 1, but instead of providing the spacing sleeve 16 and clamping the bearing sleeves on the axle arm, a sleeve 16ª is placed between the nut 18 and shoulder 21 provided by reducing the outer end portion of the axle arm. In this case, the nut 18 clamps the sleeve 16ª against said shoulder 21, said sleeve being of a length just sufficient to allow the desired amount of play in the end thrust bearings between said collar 12ª and the bearing sleeves 6, 7.

In case the sleeve 16 is used and wear occurs in the end thrust bearings, said sleeve may be shortened or a shorter sleeve substituted, and a shim or washer of a thickness corresponding to the portion that is removed from the sleeve inserted between the nut and the adjacent end of the bearing ring 7. When the sleeve 16ª is used as shown in Fig. 2, it is only necessary to shorten said sleeve to take up the wear in the end thrust bearings.

By the arrangements of the bearings herein set forth the supporting bearing rollers 8, 9, are relieved entirely of end thrust and the respective bearings are easily applied and removed from the hub and axle arm.

In some cases the filler sleeves 16 and 16ª may be dispensed with and the construction and arrangements of the bearings may be modified considerably without departing from the invention. Therefore, I do not wish to be limited to the exact construction and arrangement shown.

What I claim is:

1. The combination with an axle member having an annular shoulder at its inner end, the outer end of said axle member being reduced to provide a second annular shoulder, said reduced end portion of the axle member being screw-threaded, of a hub box having journal bearing portions near each end and an internal thrust collar between said bearing portions, journal bearing sleeves slipped on said axle member and being slidable endwise in coöperative relation to the respective bearing portions of said hub box, antifriction thrust bearings interposed between said bearing sleeves on the axle member and said internal thrust collar on the hub box, one of said bearing sleeves abutting against the annular shoulder at the inner end of said axle member and the other bearing sleeve overhanging the reduced outer end portion of the axle member, a collar sleeved on said reduced end portion of the axle member inside of the bearing sleeve and abutting against said second annular shoulder, and a nut on the screw-threaded portion of the axle member adapted for holding the adjacent bearing sleeve on the axle member, said nut being also adapted to clamp said collar against the adjacent annular shoulder on the axle member, whereby the width of said collar controls the play between said end thrust bearings.

2. The combination with an axle member, of a hub box having an internal annular abutment intermediate its ends, antifriction journal bearings interposed between said axle member and said hub box on opposite sides of said annular abutment, said journal bearings including sleeves slipped on said axle member, said sleeves having circumferential annular flanges at their adjacent ends, antifriction end thrust bearings interposed between said internal annular abutment of said hub box and rolling directly against the adjacent flanged ends of said bearing sleeves on the axle member, and means on said axle member for holding said bearing sleeves thereon from endwise movement outwardly and for positively limiting the adjustment of said end thrust bearings one toward the other.

Signed at St. Louis, Missouri this 24th day of February, 1913.

ONESIME E. MICHAUD.

Witnesses:
G. A. PENNINGTON,
M. A. SHELTON.

Copies of this patent may be obtained for five cents each, by addressing the "Commissioner of Patents, Washington, D. C."